July 1, 1941.  P. C. RAWLS  2,247,451
X-RAY FILTER
Filed Nov. 2, 1939
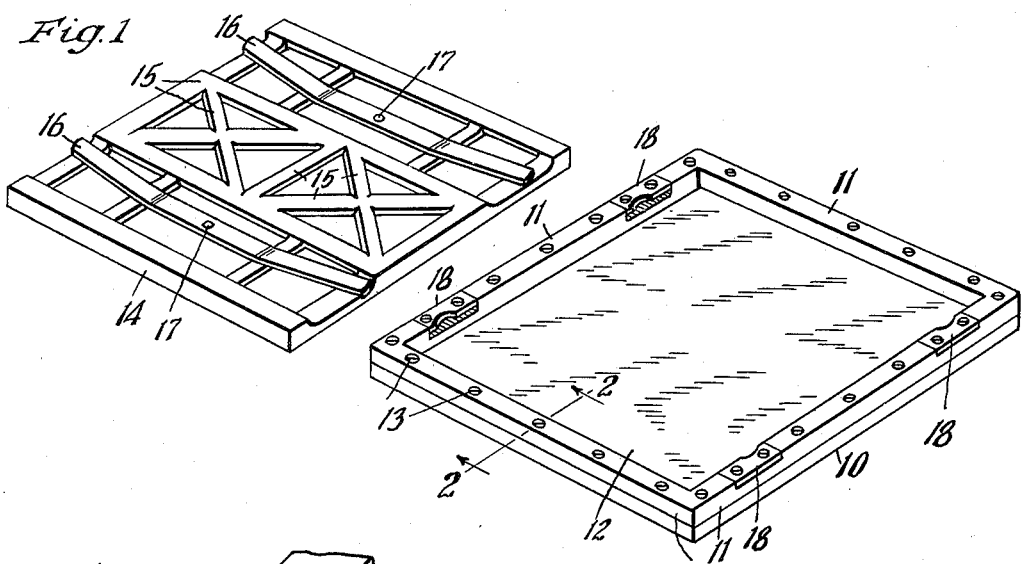
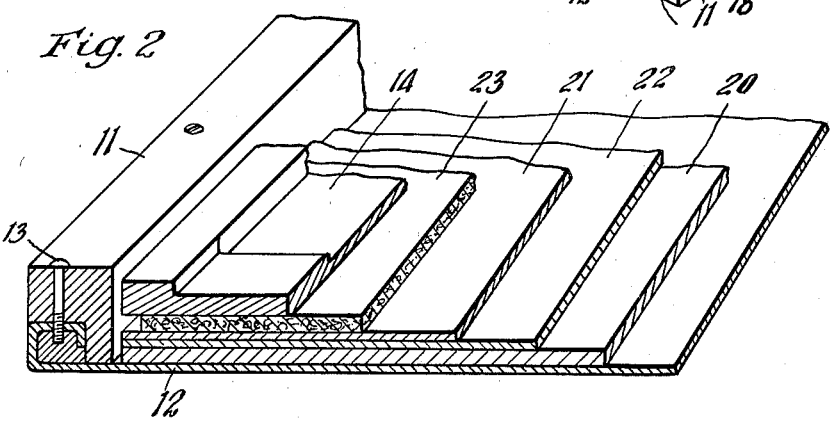
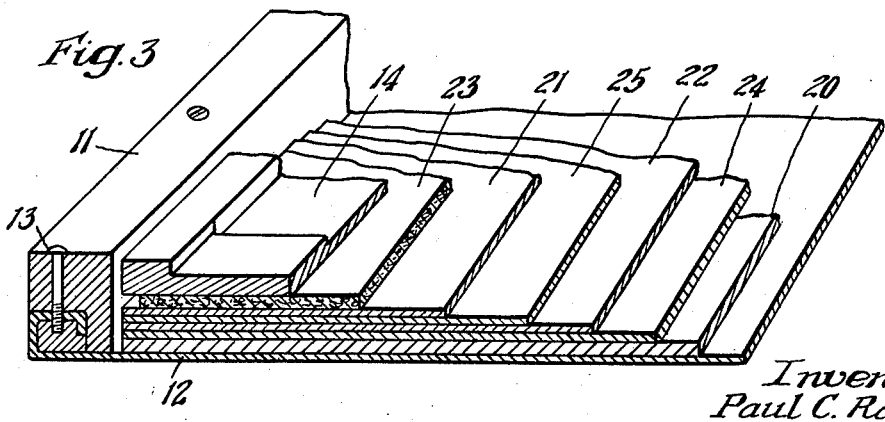
Inventor
Paul C. Rawls
By George I. Haight
Atty.

Patented July 1, 1941

2,247,451

UNITED STATES PATENT OFFICE 2,247,451

X-RAY FILTER

Paul C. Rawls, Milwaukee, Wis.

Application November 2, 1939, Serial No. 302,511

2 Claims. (Cl. 250—68)

At the present time in the production of radiographs, especially of the kind used by the medical profession, it is customary to employ a grid or diaphragm between the object being radiographed and the film, for the purpose of eliminating secondary radiation, and these grids or diaphragms are customarily composed of a series of lead strips placed on edge and spaced apart more or less from each other and arranged with their flat surfaces substantially parallel with the direct primary radiation from the X-ray source.

It is essential in the use of such grids or diaphragms while making an exposure to move the grid or diaphragm across the surface of the film to prevent the image of the lead strips from being superimposed upon the radiograph. These grids or diaphragms are very expensive, because in their manufacture the arrangement of the lead strips must be made with the greatest accuracy.

Furthermore by the use of the moving grids or diaphragms a considerable proportion of the primary X-rays are interrupted and absorbed by the grids or diaphragms, so that an excessive time for an exposure is necessary.

Furthermore, these grids or diaphragms are objectionable because on account of their structure and necessary movability they must be spaced apart from the sensitized surface of the film and in this space additional scattered and secondary radiation will occur to fog the radiograph, and in addition thereto with the said grids or diaphragms it is essential that at all times the source of X-rays be spaced exactly the same distance from the sensitized film, whereas in many instances it is desirable to have the source of X-rays a greater or lesser distance from the sensitized film.

The object of my invention is to provide means of simple, durable, and inexpensive construction in the nature of layers of filtering material arranged in contact with the surfaces of the sensitized film, and of such nature that the filter on the side of the film adjacent to the source of X-rays will permit the passage of a relatively great amount of direct primary radiation, and at the same time absorb all scattered and secondary radiation originating between the source of X-rays and the surface of the filter, and also to provide a second filter of the same material adjacent to the surface of the film farthest from the source of X-rays, which second filter is of such molecular construction and density as to permit the passage of a relatively large amount of direct radiation from the source, and at the same time absorb all scattered and secondary radiation directed toward the surface of the sensitized film farthest from the source of X-rays; whereby the time of the exposure for the creation of a perfect image upon the radiograph is materially lessened and a clearer detailed image upon the radiograph is obtained. Distortion or exaggeration of the image impressed upon the sensitized film is minimized by the elimination of the heretofore necessary spacing of the object being radiographed from the sensitized film.

A further object is to provide a filter which will permit the source of X-rays to be spaced from the sensitized film any desired distance.

I have discovered that sheets of certain material, particularly the heaviest metals such as lead or gold in relatively pure state, have a molecular arrangement which, when made of the proper thickness and arranged in the manner hereinafter defined, will permit the passage of direct primary radiation to the film and will absorb scattered and secondary radiation to such an extent as to accomplish the objects contemplated, as hereinafter more fully set forth, pointed out in my claims, and illustrated in the accompanying drawing, in which:

Fig. 1 shows a perspective view of a cassette having my improved filter contained therein, and showing the back or clamping plate removed therefrom;

Fig. 2 shows an enlarged sectional perspective view of a portion of the body of the cassette taken substantially on the line 2—2 of Fig. 1 and illustrating my improved filter embodied therein; and Fig. 3 shows a sectional view similar to Fig. 2, but illustrating a modification of the embodiment of my invention.

In Fig. 1 there is illustrated a cassette comprising a suitable frame in which is contained the X-ray film and filter. This frame 10 is rectangular, has four side members 11, and a front plate 12 which, as shown more clearly in Figs. 2 and 3, is secured to the side members by the screws 13. This structure forms a shallow container for holding the film and filters. A removable back or clamping plate 14 fits within the margins of the side members and is utilized to clamp or press the film and filter layer between itself and the front plate 12. This back plate is preferably a metal plate having ribbed reinforcement 15 for preventing the plate from being sprung out of shape. It has two clamping springs 16 pivoted at 17 and adapted to engage under clips 18 on opposite side frame members 11.

The front plate 12 is made of suitable material, having suitable properties for absorption of X-rays, and is preferably made of sheet aluminum or Bakelite. If Bakelite is used, it should be relatively thicker than aluminum to equal the absorption properties of aluminum. The plate 12 is referred to as the front plate because it is the face of the cassette which is presented to the source of X-ray radiation.

In accordance with my invention, I provide filters 20 and 21 on both sides or faces of the X-ray sensitized film 22. The X-ray film and filters are in the form of rectangular sheets superimposed one upon the other in as close or intimate relation as possible to reduce to a minimum the space between the film and filters.

In Fig. 2 it will be seen that the filter 20 is first placed in the frame against the aluminum front plate 12. The X-ray film 22, which is usually sensitized on both faces, is then placed upon the filter 20. Then the filter 21 is placed upon the film and the assembly is pressed into close contact with the film throughout the area thereof, by the back plate 14 which is preferably provided with a felt pad 23 to better distribute the pressure and avoid ridges or hollows in the sheets.

As hereinbefore stated, the filters 20 and 21 are in the form of relatively thin sheets of metal such as pure lead rolled as accurately as possible to arrange the molecular characteristics as homogeneous as possible. I have used the term "molecular" to designate the orientation of the molecules so that the filter of solid metal has no openings therethrough for the passage of X-rays except as may exist between molecules, and to distinguish from the grid or spaced lead strip type hereinbefore referred to.

Referring to Fig. 2 of the drawing, it will be seen that the filter 20 which is between the source of X-rays and the sensitized X-ray film, is of greater thickness than the filter 21, which is placed on the side of the sensitized film opposite from the source of X-rays. In practice I have demonstrated that with the filter 20 made of pure lead, having a thickness of approximately .0015 to .003 of an inch, and with the filter 21 having a thickness of approximately .001 to .002 of an inch, the following results are produced. I have obtained satisfactory results with the use of a source of X-rays employing from 50,000 to 75,000 volts and 10 milliamperes for the extremities or the lighter parts of the body, and 75,000 to 125,000 volts and 100 milliamperes for the thicker and heavier parts of the body, especially those requiring shorter exposure times, such as the chest, stomach, intestines, and so forth. The times of exposure range from $\frac{1}{10}$ of a second to ten seconds. The filter 20 permits the passage of a relatively great amount of direct primary radiation to be impressed upon the film, and at the same time it prevents the passage of scattered and secondary radiation originating in the parts of the object being radiographed. The direct primary rays which pass through the sensitized film will pass through the filter 21 without creating any appreciable amount of scattered and secondary rays; and the scattered and secondary rays that are created beyond the molecular filter 21 and returned in a general direction toward the sensitized film will be absorbed by said filter 21. I have also demonstrated that by having molecular filters arranged close to and parallel with the surface of the sensitized film as described, image distortion and loss of detail are eliminated, and undistorted and accurate detailed images are produced on the X-ray film.

My invention is well adapted to the use of intensifying screens which are often used in connection with X-ray radiography for the purpose of accelerating the time of exposure. These intensifying screens are usually made in the form of sheets of suitable paper or cardboard upon which a layer or film of intensifying material such as calcium tungstate is spread. The fluorescent properties of this intensifying material increases the actinic effect on the X-ray film by adding the fluorescent factor to the actinic effect of the primary radiation.

In Fig. 3 I have illustrated intensifying screens 24 and 25 disposed on opposite sides of the X-ray film. In assembling the parts, the screen 24 is placed between the filter 20 and the X-ray film 22. The other intensifying screen 25 is placed between the filter 21 and the X-ray film 22.

I am aware that heretofore, and particularly in dental radiography, there has been employed a so-called lead back for the films. These so-called lead backs, however, have been of such thickness and spacing and molecular arrangement, because of impurities, as to substantially absorb all of the direct primary radiation, but permit undesired scattered radiation to reach the film; whereas, in my improvement the second filter 21 is purposely of such molecular arrangement, thickness, and density relatively to the filter 20 as to permit the passage of primary radiation, but to prevent the return through the second filter of scattered and secondary radiation originating in sources beyond the second filter, or from the surface opposite from the source of the primary rays.

It is to be understood that in the drawing the thicknesses of the filters, film, intensifying plates and frame plates, are exaggerated and are not shown as drawn to any scale, but are merely for illustrative purposes and not intended as limitations. Further, the lead sheets which constitute the filters are in fact relatively thin, and in practice it may be desirable to mount them on paper or cardboard sheets for strength and to facilitate handling.

I claim:

1. In an X-ray cassette, the combination of a sensitized film and a sheet of lead sufficiently thin to be pervious to X-rays, adjacent to and parallel with said sensitized film and adapted to be positioned between the film and the source of X-rays to which the film is to be exposed, and a second sheet of lead positioned on the opposite side of and closely adjacent to said film, and sufficiently thinner than said first sheet to permit the passage therethrough of primary radiation passing through said film, but to absorb the scattered and secondary radiation originating beyond said second sheet.

2. In an X-ray cassette, the combination of a sensitized film and a relatively thin sheet of substantially pure lead disposed closely adjacent to each side of said film, the sheet on the side of the film which is positioned between the film and the source of X-ray being from .0015 to .003 of an inch in thickness, and the other sheet being from .001 to .002 of an inch in thickness, and a holder for clamping said film and sheets of lead in relative position.

PAUL C. RAWLS.